Patented Sept. 11, 1951

2,567,677

UNITED STATES PATENT OFFICE 2,567,677

PREPARATION OF GUANIDINE SULFATE

Nat H. Marsh, Noroton Heights, Conn., assignor to American Cyanamid Company, New York, N. Y., a corporation of Maine No Drawing. Application November 12, 1949, Serial No. 126,909

4 Claims. (Cl. 260—564)

The present invention relates to a novel method of preparing guanidine sulfate.

It is an object of the invention to prepare guanidine sulfate at atmospheric pressure by the use of inexpensive reagents, including urea. It is a further object of the invention to prepare guanidine sulfate using as a reagent a new compound, namely triammonium nitridotrisulfate. Additional objects will be obvious from the discussion hereinafter.

Triammonium nitridotrisulfate, $N(SO_3NH_4)_3$, can be prepared by reacting ammonia with sulfur trioxide converter gas containing about 8% by volume of sulfur trioxide. The reaction can be conducted at room temperature and atmospheric pressure simply by mixing the two reactant gases in a mol ratio of 1.5:1, whereupon triammonium nitridotrisulfate is produced as a white powder.

The following example illustrates without limiting the invention.

Example

In a tall-from beaker heated in an oil bath and equipped with stirrer and thermometer there are placed 40 g. of urea and 70 g. of triammonium nitridotrisulfate (mol ratio of reactants, approximately 3:1). The reactants are heated at a temperature of approximately 230° C. for 30 minutes. The beaker is then removed from the bath and allowed to cool. A white solid results, which contains guanidine sulfate as well as unreacted starting materials and cyanuric acid. The guanidine sulfate may be recovered by various means known to the art, such as fractional crystallization, or precipitation of the guanidine values as a sparingly soluble salt by the addition of ammonium picrate, ammonium nitrate, or the like. The yield is 38% of theory.

The temperature can vary from 190° to 255° C. but the narrower range of 225° to 235° C. is preferred. The reaction period can also vary widely, being longer at the lower temperatures and shorter at the higher temperatures. For example, at 190° C. the reaction can be extended over a 4 hour period, while at 255° C. a good yield is obtained in 15 minutes.

While urea may be reacted with triammonium nitridotrisulfate in virtually any proportion to yield guanidine sulfate within the temperature limits stated, the preferred mol ratio is about 3:1, urea:triammonium nitridotrisulfate. At different mol ratios from the preferred range an excessive amount of the reactants will pass unchanged into the reaction mass.

While the invention has been described with particular reference to specific embodiments, it is to be understood that it is not to be limited thereto but is to be construed broadly and restricted solely by the scope of the appended claims.

I claim:

1. The method of making guanidine sulfate comprising reacting urea and triammonium nitridotrisulfate at a temperature within the range 190°–255° C. and recovering the thus-formed guanidine sulfate.

2. The method according to claim 1 in which the mol ratio of urea: triammonium nitridotrisulfate is about 3:1.

3. The method according to claim 1 in which the temperature range is 225°–235° C.

4. The method according to claim 3 in which the ratio of urea to triammonium nitridotrisulfate is about 3:1.

NAT H. MARSH.

REFERENCES CITED

The following references are of record in the file of this patent:

UNITED STATES PATENTS

| Number | Name | Date |
|---|---|---|
| 2,464,247 | Mackay | Mar. 15, 1949 |

FOREIGN PATENTS

| Number | Country | Date |
|---|---|---|
| 611,417 | Great Britain | Oct. 29, 1948 |

OTHER REFERENCES

Franklin: "Nitrogen System of Compounds" (1935), pp. 167 to 169.